(12) United States Patent
Althaus et al.

(10) Patent No.: US 7,150,154 B2
(45) Date of Patent: Dec. 19, 2006

(54) POWER STATION

(75) Inventors: Rolf Althaus, Flawil (CH); Martin Koller, Baden (CH)

(73) Assignee: Alstom Technology Ltd., Baden (CH)

( * ) Notice: Subject to any disclaimer, the term of this patent is extended or adjusted under 35 U.S.C. 154(b) by 287 days.

(21) Appl. No.: 10/819,924

(22) Filed: Apr. 8, 2004

(65) Prior Publication Data

US 2005/0178114 A1 Aug. 18, 2005

(30) Foreign Application Priority Data

Feb. 13, 2004 (DE) .................... 10 2004 007 482

(51) Int. Cl.
*F02C 6/16* (2006.01)

(52) U.S. Cl. .................. 60/727; 60/39.183; 60/650; 60/652; 60/659

(58) Field of Classification Search ............ 60/39.183, 60/650, 652, 659, 727
See application file for complete search history.

(56) References Cited

U.S. PATENT DOCUMENTS

| 4,150,547 A | * | 4/1979 | Hobson ............... 60/659 |
| 4,441,028 A | * | 4/1984 | Lundberg ............ 60/727 |
| 4,872,307 A | * | 10/1989 | Nakhamkin .......... 60/772 |
| 5,537,822 A |   | 7/1996 | Shnaid et al. |
| 5,685,155 A | * | 11/1997 | Brown et al. ........ 60/659 |
| 5,934,063 A | * | 8/1999 | Nakhamkin .......... 60/727 |
| 6,745,569 B1 | * | 6/2004 | Gerdes ................. 60/727 |
| 7,073,335 B1 | * | 7/2006 | Gerdes et al. ........ 60/727 |
| 2003/0131599 A1 |   | 7/2003 | Gerdes |

FOREIGN PATENT DOCUMENTS

DE 102004040890 A1 * 3/2005

* cited by examiner

*Primary Examiner*—Michael Koczo, Jr.
(74) *Attorney, Agent, or Firm*—Cermak & Kenealy, LLP; Adam J. Cermak

(57) ABSTRACT

A compressed air energy storage power station comprises a first shafting (1) and a second shafting (2). A gas turbo group (11), an electrical machine (12) and a compressor (13) are arranged on the first shafting (1). Switchable clutch elements (14, 15) are arranged between the electrical machine and the gas turbo group or the compressor. The clutch elements allow a connection to be selectively made between the electrical machine and the gas turbo group (11) or the compressor (13). An expansion machine (21) for the power generating expansion of a pressurized storage fluid, an electrical machine (22) and a compressor (23) are arranged on the second shafting (2). Switchable clutch elements (24, 25) are arranged between the electrical machine and the expansion machine or the compressor and allow the electrical machine to be optionally connected to the expansion machine and to the compressor. The electrical machines are operable both as generators and as electric motors.

12 Claims, 3 Drawing Sheets

POWER STATION

This application claims priority under 35 U.S.C. § 119 to German patent application number 10 2004 007 482.8, filed 13 Feb. 2004, the entirety of which is incorporated by reference herein.

TECHNICAL FIELD

The present invention relates to a power station as claimed in claim 1.

PRIOR ART

Compressed air energy storage power stations have been described in the prior art, for example in U.S. 2003/0131599 or U.S. Pat. No. 5,537,822. The storage fluid is generally stored at pressures exceeding 50 bar, and in particular exceeding 100 bar, in order to make it possible to store as much energy as possible in the available storage volumes. U.S. Pat. No. 5,537,822 also discloses power stations in which a compressor and an expansion machine are arranged on a common shafting with an electrical machine which can be operated both as an electric motor and as a generator. Furthermore, U.S. Pat. No. 5,537,822 discloses power stations in which a gas turbo group is arranged in addition to a single-shaft compressed air energy storage arrangement. An arrangement such as this may be regarded as being disadvantageous because, for example, all of the compressor power must in each case be made use of. When the compressed air energy storage system is in the charging mode, there is therefore little flexibility. Furthermore, an electrical machine must be arranged not only on the shafting for the compressed air energy storage arrangement but also on the shafting for the gas turbo group. The electrical machine which is arranged on the shafting of the compressed air energy storage arrangement must be designed for the maximum power of the expansion machine and of the compressors. The electrical machine in the gas turbo group, on the other hand, is unused when the compressed air energy storage system is in the charging mode. Provided that the compressor power is greater than the power of the expansion machine, the electrical machine in the compressed air energy storage arrangement must be designed to be larger than would be necessary for the power mode. In contrast, the electrical machine in the exhaust gas turbo group remains unused in the charging mode, in which the compressed air energy storage volume is charged with the pressurized storage fluid. In consequence, this results on the one hand in the need to use an excessively large electrical machine while, on the other hand, another electrical machine remains unused at times.

Furthermore, it has been found that, in the case of pressure ratios above 50 or exceeding even 100, compressors and/or compressor units which are arranged on a common shafting are subject to considerable problems at high power levels of around 120 MW. According to the prior art, turbocompressors for the stated pressure ratios are thus commercially available only up to unit power levels of around 100 to 120 MW. It has also been found that starting devices, for example static frequency converters, which likewise have very high ratings and can be provided only at very high cost, are required for starting the compressors in a rating class such as this up to the rated rotation speed. It is thus also known from the prior art for compressors and/or compressor units with lower power ratings to be arranged separately. However, this means a large number of components, so that a power station such as this is expensive and complex and, in addition, occupies a large amount of space. Summarizing, it can thus be stated that arrangements according to the prior art only unsatisfactorily make use of the applied resources and thus also of the capital invested, and the arrangement of the components of the compressed air energy storage system allows only inadequate operational flexibility.

SUMMARY OF THE INVENTION

One aspect of the present invention is therefore to specify a power station of the type mentioned initially which avoids the disadvantages of the prior art. According to another aspect of the invention, the invention is to specify a power station allowing maximum flexibility during operation. A further aspect of the invention has the aim of specifying a power station which requires only a small number of shaftings. In still another aspect a further aim is also to ensure that compressors and power machines which can be produced easily and are as easily available as possible on the market can be used. Yet another aspect of the invention has the aim of specifying a power station such as this whose total compressor power in the charging mode is more than 100 MW, in particular more than 120 MW, for example in the range from 150 MW to 200 MW.

The core of the invention is thus to split the maximum compressor power consumption capacity in arranging two shaftings in a power station, each of which is fitted with an electrical machine and at least one compressor, with a first shafting furthermore being fitted with a gas turbo group, and an expansion machine in order to expand a storage unit producing work being arranged on a second shafting.

For the purposes of the present disclosure "a compressor" should be understood as meaning not only a single compressor but, in general, compressor units or compressor trains which are arranged on a shafting. This may, in fact, comprise two or more compressors which are connected in series in terms of the flow and optionally comprise intercoolers. For example, for the purposes of the nomenclature used here, a compressor may comprise a low-pressure compressor which, by means of an intercooler, feeds a medium-pressure compressor, which in turn feeds a high-pressure compressor via an intercooler. In this case, the low-pressure compressor, the medium-pressure compressor and the high-pressure compressor are arranged on one shafting. In this case, a shafting does not necessarily mean that the low-pressure compressor, the medium-pressure compressor and the high-pressure compressor must be arranged on a common, rigidly coupled shaft. On the contrary, gearbox units may also be arranged between the individual compressor elements. They are frequently necessary because, for example, the operation of a high-pressure compressor at the present pressure ratios generally requires a higher rotational speed than operation of a low-pressure compressor. Thus, for the purposes of the present disclosure, the expression "shafting" generally also covers two or more shafts which are connected by means of gearboxes. Within the scope of the present invention, this allows gas turbo groups, expansion machines and compressors to be used whose rated rotation speed is not the same as the mains-synchronous rotation speed of the electrical machines.

The compressors, the expansion machine and the gas turbo group may advantageously be each arranged at an end of a shafting. An electrical machine is in each case arranged between a compressor and the gas turbo group, and between a compressor and the expansion machine, and can be operated both as a generator and as an electric motor. A switchable clutch element is arranged between the electrical machines and the respective processing machines or power machines, allowing a mechanical connection to be made between the electrical machine and the compressor or the gas turbo group, or the expansion machine. Thus, when the power station is in the power mode, an electrical machine is connected to the gas turbo group and/or to the expansion machine, and is operated as a generator. The connection to the respective compressor is in this case opened. When the power station is in the charging mode, the connection to the gas turbo group and to the expansion machine is disconnected, and a connection is made to a compressor; the electrical machine is then operated as an electric motor in order to drive a compressor. Thus, according to the invention, both electrical machines can be operated and used not only in the power mode but also in the charging mode of the compressed air energy storage system.

According to a first embodiment of the invention, a first compressor, which is arranged on the first shafting, and a second compressor, which is arranged on the second shafting, are connected in parallel in terms of flow, such that both compressors suck in ambient air, and both compressors feed a common storage volume. According to a second embodiment of the invention, the first and the second compressor are connected in series in terms of flow, such that one of the compressors feeds a partially compressed fluid to the other compressor; the other compressor compresses the fluid further, and passes the completely compressed fluid to the storage volume. A cooler for the partially compressed fluid is advantageously arranged between the two compressors in the second embodiment. The first embodiment has the advantage that the compressors can be operated independently of one another, thus resulting in greater flexibility in the charging mode: this is because it is possible without any problems to use only a portion of the compressor power, and thus to limit the power consumption in the charging mode. The second embodiment has the advantage that the increase in pressure can be distributed between the two compressors, such that each of the compressors needs to process only a lower pressure ratio.

It is furthermore advantageous for the power station according to the invention to have a heat supply device, which is arranged in the flow path from the storage volume to the expansion machine and allows heat to be supplied to the storage fluid as it flows to the expansion machine. In one embodiment of the invention, this heat supply device is an exhaust gas heat exchanger for the gas turbo group, in which exhaust gas heat from the gas turbo group is transferred usefully to the storage fluid. However, if no further measures are taken, this requires virtually necessarily simultaneous operation of the gas turbo group and of the expansion machine. An alternative embodiment of the invention is thus also proposed, in which a heat supply device which is independent of the gas turbo group is arranged in the flow path from the storage volume to the expansion machine. In a further development of the invention, this independent heat supply device is in the form of a burner device which is arranged directly in the flow path. In a second development of the invention, the independent heat supply device is in the form of a heat exchanger with an external burner device. One major advantage of the first embodiment in this case is the low complexity. Its disadvantage is that corrosive flue gases are supplied to the expansion machine. Despite the greater expense and complexity, the embodiment with an indirect burner has a major advantage in this case: the expansion machine does not have corrosive combustion gases supplied to it, and it is thus possible to use a comparatively simple and cheap machine, such as a standard off-shelf steam turbine which requires only minor changes for this application. Furthermore, an indirect burner allows the storage fluid to be expanded in the expansion machine to such an extent that the outlet temperature of the storage fluid from the expansion machine falls to the ambient temperature, or even below it, thus resulting in very small outlet flow heat losses. This is possible because there is no concern about falling below the dew point of corrosive flue gas components. If, on the other hand, a direct burner is used, then an expansion machine must be chosen which is resistant to corrosive flue gases and, in the end, this necessitates considerably more expensive components in order to achieve the same life time. Care must also be taken to ensure that the temperature of the working fluid when it emerges from the expansion machine does not fall below the dew point of the flue gas components, since serious corrosion damage will otherwise occur. The outlet temperature from the expansion machine is then, for example, maintained above 130° C., thus resulting in comparatively greater exhaust gas heat losses.

The heat supply apparatus which can be arranged here is particularly highly suitable for use of low-temperature heat, such as solar heat or other heat that occurs at a low temperature level, since the storage fluid flowing through is at a low temperature.

In one preferred embodiment of the invention, the generation power capacity which is arranged on a shafting in the form of the gas turbo group or the expansion machine is greater than or at least equal to the power of the compressor which is arranged on the same shafting. This results in the best-possible matching of the rating of the electrical machine and of the necessary electrical equipment, such as transformers, switching units and starting apparatuses, both for operation of the electrical machine as a generator and as an electric motor.

The compressors are preferably designed such that they are able to be operated with pressure ratios in excess of 50 and, in particular, exceeding 100. Under normal ambient conditions, this means that the pressure of the stored fluid exceeds 50 and, in particular, exceeds 100 bar. In one embodiment of the invention, the total compressor power of the two compressors together exceeds 100 MW and, in particular, exceeds 120 MW, ind lies, for example, between 150 and 200 MW. The compressor power which is installed on a single shafting is preferably below approximately 115 to 120 MW, for example 50 to 110 MW.

Further advantageous embodiments and methods of operation of the power station according to the invention will be evident to a person skilled in the art in the light of the exemplary embodiments described in the following text and of the dependent claims.

BRIEF DESCRIPTION OF THE DRAWINGS

The invention will be explained in more detail in the following text with reference to exemplary embodiments which are illustrated in the drawing, in which, in brief.

Figure 1:
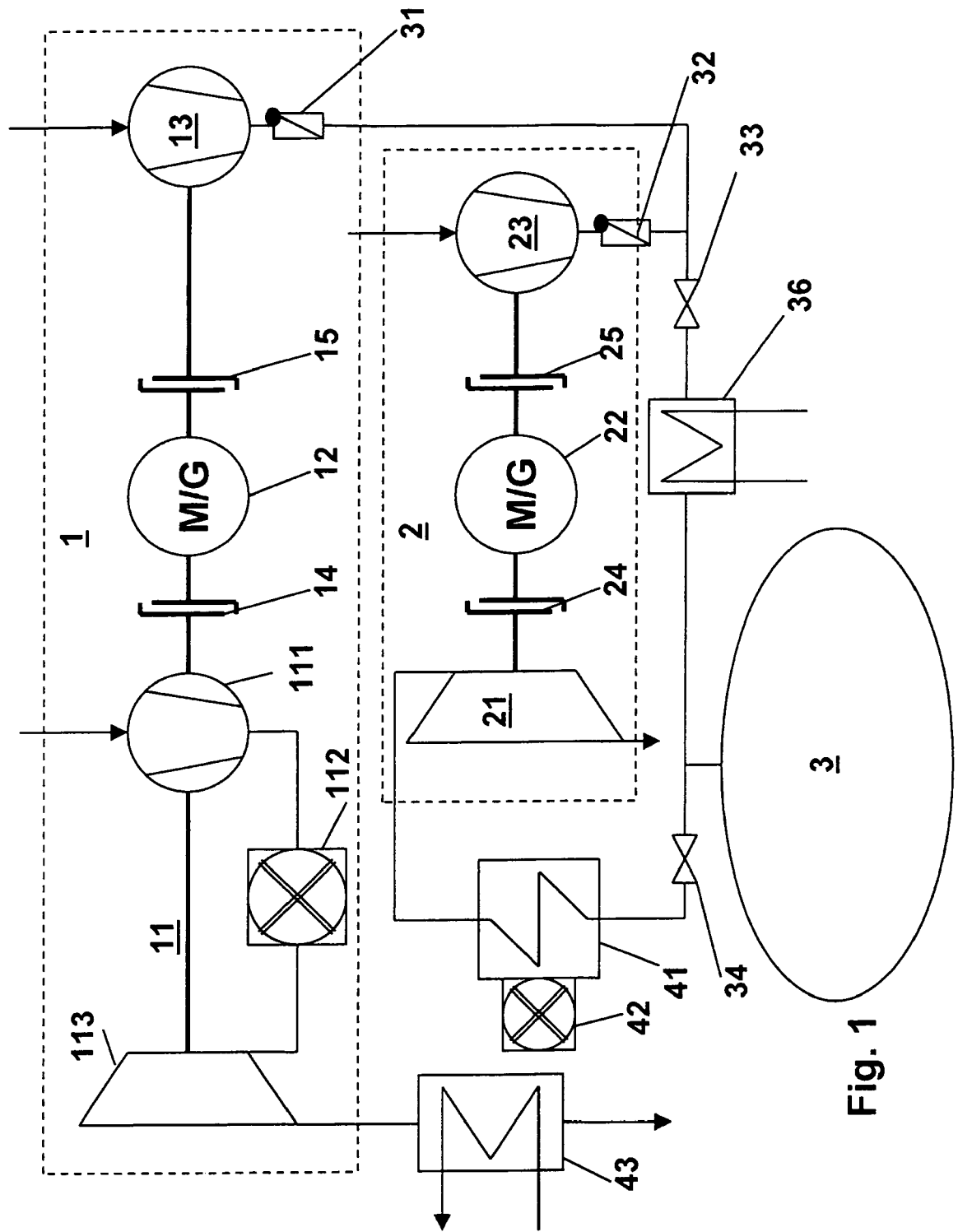
FIG. 1 shows a first power station according to the invention.

The exemplary embodiments and the drawing should be regarded as purely illustrative and should not be used to restrict the invention as characterized in the patent claims.

APPROACHES TO IMPLEMENTATION OF THE INVENTION

A first exemplary embodiment of a power station according to the invention is illustrated in FIG. 1. The power station comprises a first shafting 1 and a second shafting 2. A gas turbo group 11 and a compressor 13 are arranged on the first shafting 1. The gas turbo group and the compressor are arranged at the two ends of the shafting. An electrical machine 12 is arranged between the gas turbo group 11 and the compressor 13 and can be operated both as an electric motor and as a generator. Switchable clutch elements 14 and 15 allow the electrical machine to be optionally mechanically connected to the gas turbo group 11 and to the compressor 13. In the present case, the gas turbo group 11 is illustrated as a simple gas turbo group, which will be immediately familiar to a person skilled in the art. It comprises a compressor 111, a combustion chamber 112, and a turbine 113. A different type of gas turbo group may, of course, also be used here, for example a gas turbo group with sequential combustion, such as is known from EP 0 620 362. An expansion machine 21 and a compressor 23 are arranged at the two ends of the shafting on the second shafting 2. An electrical machine 22 which can be operated both as a generator and as an electric motor is arranged between the expansion machine and the compressor. The electrical machine can by means of the clutch elements 24 and 25 be optionally mechanically coupled to the expansion machine 21 and to the compressor 23. In the present case, the compressors 13 and 23 are illustrated as simple turbocompressors; without any restriction to the invention, the compressors may also comprise intercooling, or two or more compressors connected in series in terms of the flow may be arranged on one shafting, with or without intercoolers. A step-up or step-down gearbox, which is not illustrated in the present exemplary embodiment, may likewise be arranged within a shafting between the electrical machine and the compressor and/or the expansion machine and the gas turbo group in a manner which is known per se to a person skilled in the art, such that the rotational speed of the respective power machine or processing machine differs from the rotationla speed of the electrical machine. Particularly in periods of high energy demand, the power station is operated in the power mode. In this case, at least one of the clutch elements 14, 24 is closed, thus providing the appropriate mechanical connection; the clutch elements 15 and 25 are opened, and the corresponding mechanical connection is thus disconnected. The gas turbo group 11 is operated in a manner known per se in order to drive the electrical machine 12. By way of example, a heat recovery steam generator 43, which will be familiar per se to a person skilled in the art, is arranged downstream from the turbine 113 in the flow path of the gas turbo group 11. The arrangement of the heat recovery steam generator 43 is optional and is not per se relevant to the invention. Steam is produced in the waste heat steam generator 43 in a manner known per se by means of the residual energy contained in the exhaust gases from the gas turbo group, and the steam can be used, once again in a manner which is known per se, for driving a steam turbine or for other process purposes. Furthermore, it is also known for the steam that is generated there to be introduced into the gas turbo group and to be expanded in the turbine of the gas turbo group, producing useful work. The expansion machine 21 is operated in order to drive the electrical machine 22. A storage fluid which is stored under pressure in the storage volume 3 is passed via the control element 34 to the expansion machine 21, where it is expanded producing work. The storage fluid flows through a heat supply device on its way from the storage volume 3 to the expansion machine 21, and is thereby heated. In the present case, the heat supply device is illustrated as a heat exchanger 41 with an external burner device 42. The advantages which result from this arrangement in comparison to a direct burner arraged in the storage fluid flow path have already been described above. The heat exchanger 41 is, in addition, particularly well suitable for use of low-temperature heat, such as solar heat or other heat that is produced at a low temperature level, since the inlet storage fluid is at a low temperature and there is generally no need for a high inlet flow temperature for the expansion machine 21. In contrast, it is advantageous to limit the temperature at the inlet of the expansion machine 21, for example to a temperature of less than 500° C. or less than 550° C. This likewise makes it easier to use commercially available, low-cost expansion machines, such as steam turbines, which are not designed for extremely high inlet temperatures. Limiting the inlet temperature means that there is no need to use expensive materials which are resistant to high temperatures and are expensive to process. Heating the storage fluid prior to expansion in the expansion machine 21 increases the mass-specific enthalpy gradient of the storage fluid, thus increasing the achievable power yield from the storage fluid which is stored in the storage volume 3. When a large amount of energy is available and the electricity price is correspondingly low, for example at night, the power station is operated in the charging mode. In this case, at least one of the compressors 13 and 23 feeds a compressed storage fluid to the storage volume 3. The control element 34 is closed, and the control element 33 is opened. The compressors 13 and 23 can be operated individually. This allows advantageous graduation of the power consumption of the power station in the charging mode. A particularly advantageous control capability is provided if the compressors 13 and 23 have different ratings. For example, if the rating of one of the compressors is twice that of the other, then it is possible to vary the power consumption of the power station in the ratio 1:2:3, with the compressors each operating at the rated operating point. Non-return elements 31 and 32 are arranged downstream from the compressors, and prevent fluid from flowing backward through the compressors. The compressors 13 and 23 preferably feed and compress ambient air, which is stored in pressurized form in the storage volume 3. According to one embodiment of the invention, a cooler 36 is arranged downstream from the compressors 13, 23 and upstream of the storage volume 3. The cooler 36 can be used to cool down the fluid, which was heated during the largely adiabatic compression, before it is supplied to the storage volume 3. For the charging mode, at least one of the clutch elements 15 and 25 is closed, and the clutch elements 14 and 24 are opened. At least one of the electrical machines 12 and 22 is operated as an electric motor and drives a compressor 13, 23, so that the storage volume 3 is charged with storage fluid which is then available once again for expansion, thus producing useful work, in the expansion machine 21.

Figure 2:
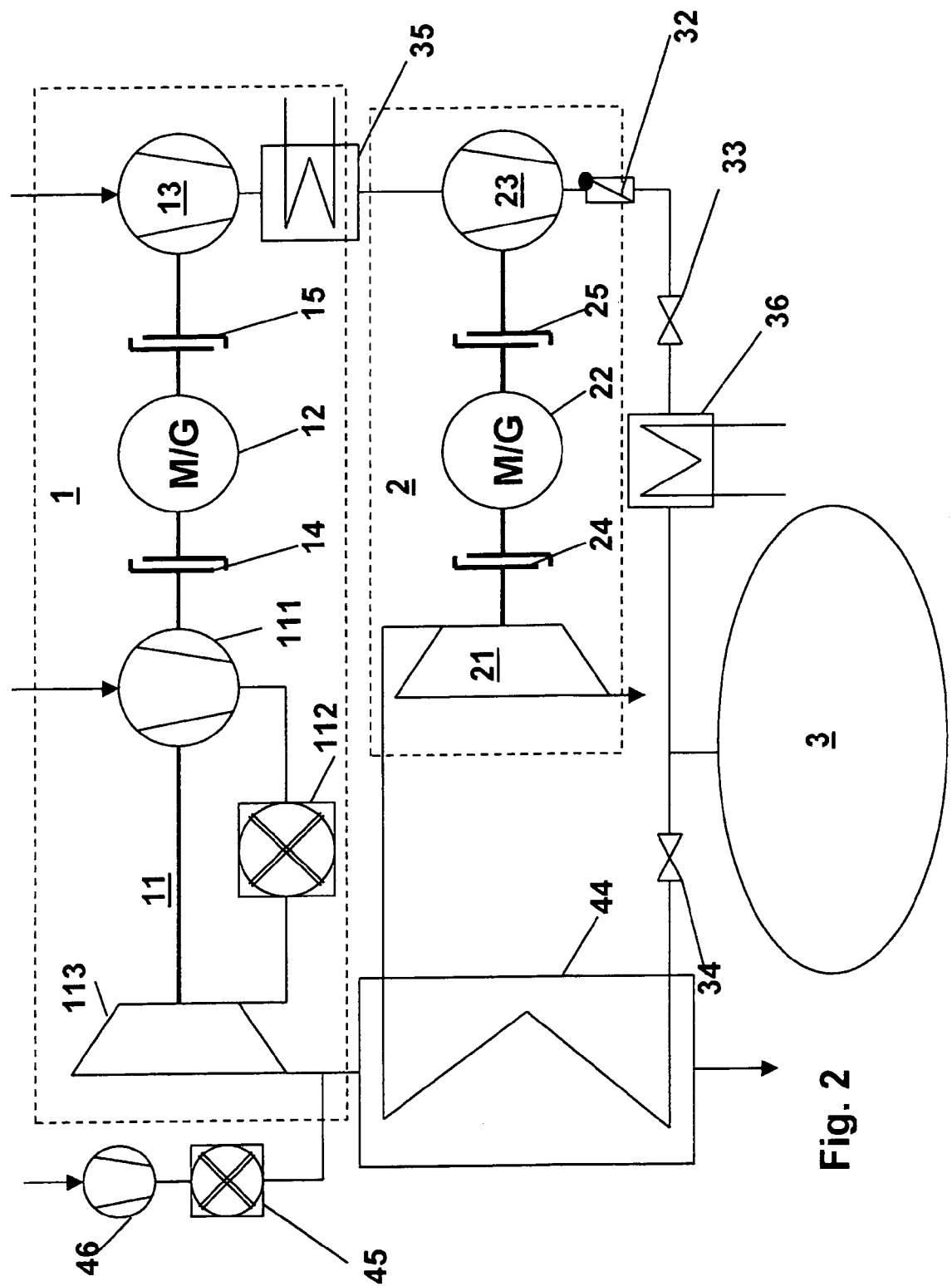
FIG. 2 shows a second exemplary embodiment of a power station according to the invention.

A further embodiment of the invention is illustrated in FIG. 2. In the same way as the power station illustrated in FIG. 1, the power station illustrated in FIG. 2 also has two shaftings 1 and 2, on each of which an electrical machine 12, 22, a compressor 13, 23 and a gas turbo group 11 or a storage fluid expansion machine 21 are arranged. In contrast to the power station illustrated in FIG. 1, the compressors 13 and 23 are not connected in parallel in terms of flow, but in series, such that fluid which has been compressed by the compressor 13 flows to the compressor 23, which compresses it further. A cooler 35 for the fluid which has been partially compressed by the compressor 13 is arranged downstream from the compressor 13 and upstream of the compressor 23. A further cooler 36 for cooling the compressed fluid is arranged downstream from the compressor 23. In the illustrated embodiment, an exhaust gas heat exchanger 44 is arranged in the exhaust gas flow path from the gas turbo group 11. The exhaust gas from the gas turbo group flows through the primary side of the exhaust gas heat exchanger 44, on the heat-emitting side. When the storage fluid expansion machine 21 is in the power mode, storage fluid is passed through the exhaust gas heat exchanger 44 from the storage volume 3 and via the control element 34, flowing in the opposite direction to the exhaust gases from the gas turbo group; the storage fluid absorbs heat from the exhaust gases, is thus heated, and the heated storage fluid is expanded in the storage fluid expansion machine, producing useful work. The maximum achievable temperature of the storage fluid resulting from this corresponds essentially to the temperature of the exhaust gas at the outlet from the turbine 113 of the gas turbo group 11. With state-of-the-art gas turbo groups, this is typically in the region of around 550° C., and provides a virtually perfect match with the maximum permissible inlet temperature of the pressure storage expansion machine 21. The power station in FIG. 2 is operated in a completely analogous manner to the exemplary embodiment illustrated in FIG. 1 and explained above. When the power station is in the power mode, the electrical machines 12 and/or 22 are/is operated as generators or as generators. In this case, the clutches 14 and/or 24 are closed, the clutches 15 and 25 are opened, and the electrical machines are driven by the power machines 11 and/or 21. During operation of the storage fluid expansion machine 21, the storage volume 3 is emptied. When the power station is in the charging mode, the electrical machines 12 and 22 are operated as electric motors. In this case, the clutches 14 and 24 are opened, and the clutches 15 and 25 connect the electrical machines to the compressors 13 and 23. Since the compressors 13 and 23 are connected in series, the compressors of the two shaftings cannot be operated independently of one another. This means that operation of one of the compressors also requires operation of the other compressor. During operation of the compressors, the storage volume 3 is charged with pressurized storage fluid, which is then available once again for power generating expansion in the storage fluid expansion machine 21. Highly expediently and advantageously, the temperature of the exhaust gas from the gas turbo group is measured downstream from the heat exchanger 44 and, for example, the control element 34 is controlled in order to set the storage fluid mass flow such that the temperature does not fall below the dew point of the exhaust gas, and/or a safety margin is maintained with respect to the dew point of the exhaust gases. An additional burner device can be arranged upstream of the exhaust gas heat exchanger 44 or within the exhaust gas heat exchanger, in order to make more thermal power available to the storage fluid. In the embodiment illustrated by way of example, an additional burner 45 with a fan 46 is arranged upstream of the exhaust gas heat exchanger 44, but not in the flow path of the exhaust gas from the gas turbo group. The operation of the fan 46 results in fresh air being passed to the additional burner 45, where a fuel can be burnt. The resultant flue gases are passed through the exhaust gas heat exchanger 44, and are likewise available for heating the storage fluid in the exhaust gas heat exchanger 44. The external arrangement of the additional burner 45 with a fresh air fan 46 has the advantage that the storage fluid expansion machine 21 can be operated with heated storage fluid even when the gas turbo group 11 is not running. This considerably increases the operational flexibility of the power station. Furthermore, an exhaust gas bypass (not shown) for the exhaust gas of the gas turbo group can also be arranged, and allows the exhaust gas from the gas turbo group to bypass the exhaust gas heat exchanger 44. This has considerable advantages when, for example, it is intended to operate the gas turbo group when the storage fluid expansion machine is not running and the storage volume 3 has been completely emptied. This avoids thermal loading or overloading of the exhaust gas heat exchanger 44 when there is no flow through it on the secondary side.

Figure 3:
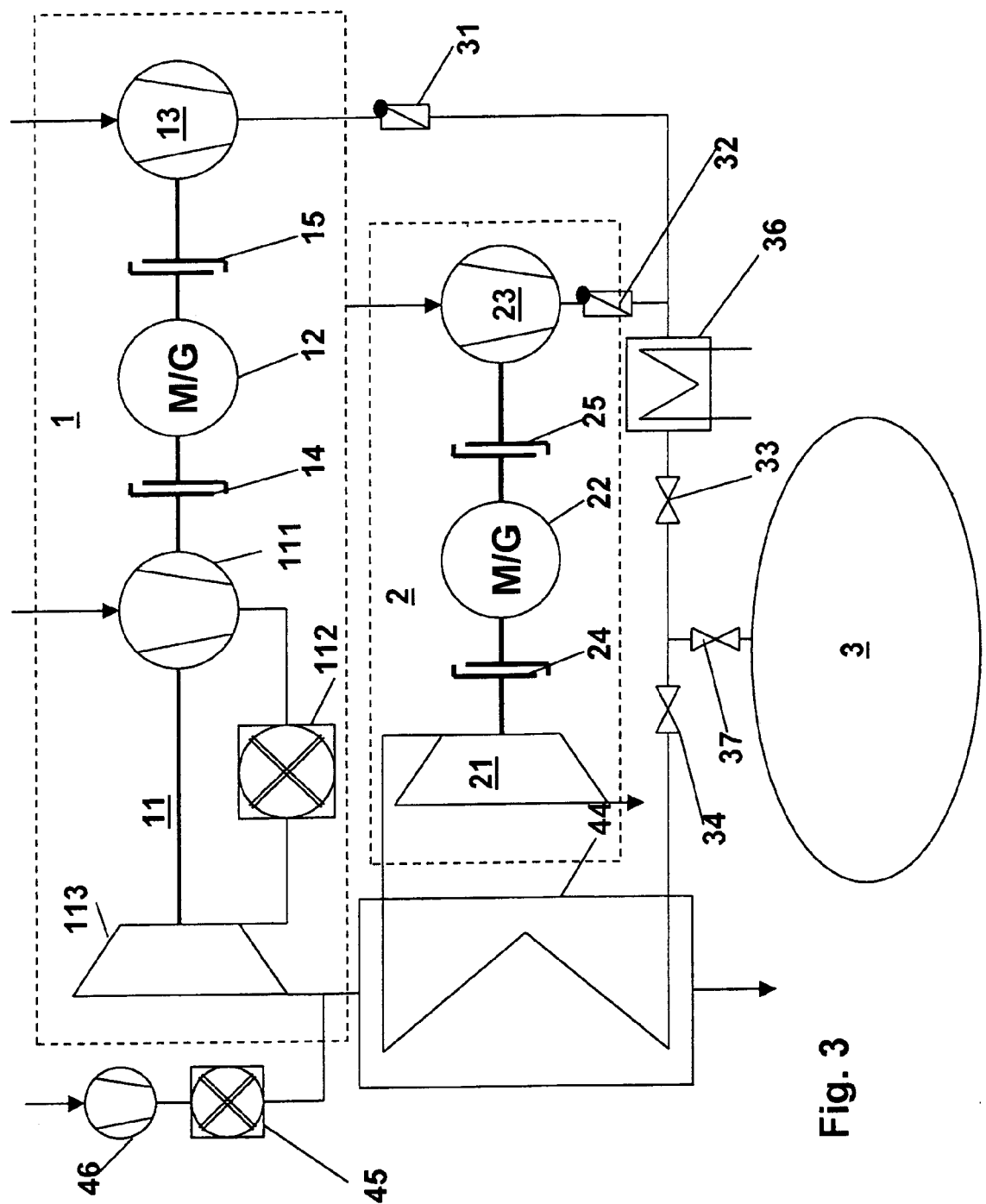
FIG. 3 shows a further example of one advantageous refinement of a power station according to the invention.

The power station according to the invention illustrated by way of example in FIG. 3 is designed identically to the power station illustrated in FIG. 2 in terms of the thermal circuitry of the gas turbo group 11 and the storage fluid expansion machine 21. The compressors 13 and 23 which are arranged on the two shaftings are arranged in parallel in terms of flow, as in the exemplary embodiment of FIG. 1, thus resulting, as described, in greater flexibility during operation of the power station. In the exemplary embodiment illustrated here, a shut-off element 37 is arranged at the storage volume 3. This detail considerably increases the operational flexibility, as described in the following text. The illustrated embodiment allows the power station to be operated in the power mode even when the storage volume 3 is empty. During this type of operation, the clutches 14 and 24 connect not only the gas turbo group 11 but also the expansion machine 21 to the electrical machines 12 and 22. At least one of the clutches 15, 25 connects an electrical machine to one of the compressors 13, 23. In this operating mode, the shut-off element 37 is closed, and the empty or inadequately filled storage volume 3 is thus disconnected from the power station. The control elements 33 and 34 are opened. Compressed air which is fed from the compressors 13 and/or 23 is passed via the exhaust gas heat exchanger 44 to the expansion machine 21, where it is expanded, generating power. Thereby, the fluid is heated in the exhaust gas heat exchanger 44. It is thus possible to operate the expansion machine even when there is inadequate pressure in the storage volume. Furthermore, the exhaust gas heat from the gas turbo group 11 can advantageously be used even when the storage volume is empty. The gas turbo group 11 can thus be operated without any problems even when no fluid is available from the storage volume 3 and no bypass line is arranged for the exhaust gas heat exchanger 44. In this operating mode, the cooler 36 is advantageously not used at all.

The exemplary embodiments described above on the one hand illustrate the high degree of operational flexibility of the power station according to the invention. It is also clear that the applied resources are utilized far better than in the case of power stations that are known from the prior art. In particular, each of the electrical machines can be operated both in the power mode and in the charging mode of the power station. The gas turbo group allows power to be produced even when the storage volume 3 is completely empty. In the light of these statements, further possible embodiments of the invention will be immediately evident to a person skilled in the art. Further saving and improvement potentials are opened up by the fact that the electrical machines which are arranged on the two shaftings can use common electrical equipment. For example, only one mains connection transformer, a so-called step-up transformer, and one starting device, for example a static frequency converter, is thus required for the power station with two shaftings. This further reduces the investment costs and the use of resources. The space required is also considerably reduced, because this allows the entire power station to be more compact.

LIST OF REFERENCE SYMBOLS

1 First shafting
2 Second shafting
3 Storage volume
11 Gas turbo group
12 Electrical machine
13 Compressor, turbocompressor
14 Clutch element, clutch
15 Clutch element, clutch
21 Expansion machine, storage fluid expansion machine
22 Electrical machine
23 Compressor, turbocompressor
24 Clutch element, clutch
25 Clutch element, clutch
31 Non-return element, non-return valve
32 Non-return element, non-return valve
33 Control element, valve
34 Control element, valve
35 Cooler
36 Cooler
37 Shut-off element
41 Heat transmitter
42 Burner device
43 Waste heat steam generator
44 Exhaust gas heat exchanger
45 Additional burner
46 Fresh air fan

The invention claimed is:

1. A compressed air energy storage power station having a compressor power consumption capacity and a power generation capacity, the power station comprising:
    a gas turbo group;
    a storage fluid expansion machine for a pressurized storage fluid, wherein the gas turbo group and the expansion machine provide the power generation capacity;
    a first electrical machine;
    a first shafting, wherein the gas turbo group is arranged together with the first electrical machine on the first shafting;
    a second electrical machine;
    a second shafting, wherein the expansion machine is arranged together with the second electrical machine on the second shafting;
    a first compressor and a second compressor, the compressor power consumption capacity being split between the first compressor and the second compressor, the first compressor being arranged on the first shafting, and the second compressor being arranged on the second shafting.

2. The power station as claimed in claim 1, further comprising:
    an exhaust gas heat exchanger in the gas turbo group having a primary side and a secondary side, arranged and adapted for flowing expanded hot gas from the gas turbo group through the primary side of the exhaust gas heat exchanger, and arranged and adapted for flowing storage fluid through the secondary side before supplying it to said storage fluid expansion machine.

3. The power station as claimed in claim 1, further comprising:
    a common storage volume; and
    wherein the first compressor and the second compressor are fluidly connected in parallel, such that each of the first compressor and the second compressor sucks in ambient air and both of the first and second compressors feed into the common storage volume.

4. The power station as claimed in claim 1, further comprising:
    a storage volume; and
    wherein the first and second compressors are fluidly connected in series, such that one of the first compressor and the second compressor sucks in ambient air and passes compressed air to the other of the first compressor and the second compressor, and said other compressor feeds further-compressed air to the storage volume.

5. The power station as claimed in claim 4, further comprising:
    a cooler for the compressed fluid arranged fluidly between the first and second compressors.

6. The power station as claimed in claim 1, further comprising:
    a heat supply device arranged and adapted to flow storage fluid therethrough before supplying the storage fluid to the storage fluid expansion machine.

7. The power station as claimed in claim 1, wherein the first and second electrical machines are configured and arranged to be operable as electric motors and as generators.

8. The power station as claimed in claim 1, wherein the maximum power output of the gas turbo group is greater than or equal to the maximum power consumption of the first compressor, and the maximum power output of the expansion machine is greater than or equal to the maximum power consumption of the second compressor.

9. The power station as claimed in claim 1, wherein the maximum pressure ratio of compression is greater than 50.

10. The power station as claimed in claim 9, wherein the pressure ratio of compression is greater than 100.

11. The power station as claimed in claim 1, wherein the total combined compressor power of the first compressor and of the second compressor is greater than 100 MW.

12. The power station as claimed in claim 11, wherein the total combined compressor power of the first compressor and of the second compressor is greater than 120 MW.

* * * * *